Figure 1:
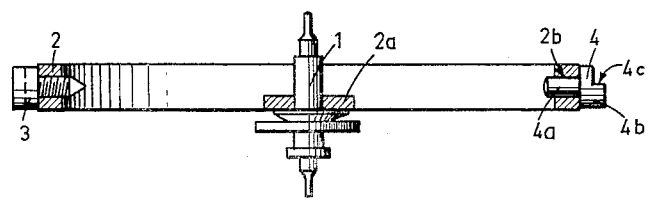

Nov. 8, 1960 P. JAHN 2,958,997
COMPENSATABLE BALANCE WHEEL
Filed Oct. 11, 1955 2 Sheets-Sheet 1

INVENTOR:
PAUL JAHN
BY
Young, Emery & Thompson
ATTORNEYS

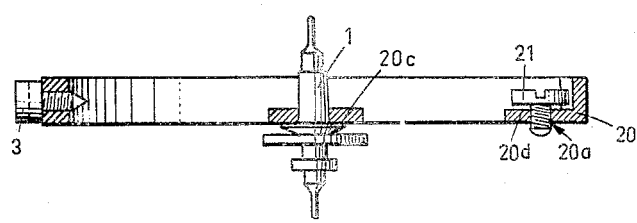
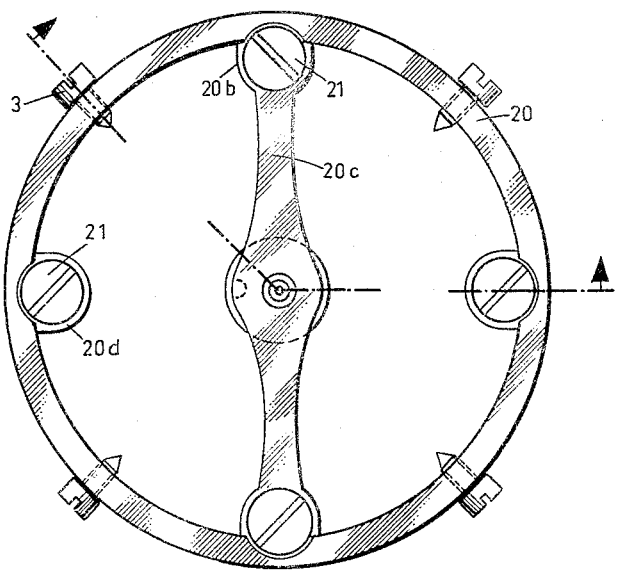

United States Patent Office 2,958,997
Patented Nov. 8, 1960

2,958,997
COMPENSATABLE BALANCE WHEEL
Paul Jahn, Kirnbachstrasse 25, Schramberg, Black Forest, Germany
Filed Oct. 11, 1955, Ser. No. 539,817
Claims priority, application Germany Oct. 11, 1954
2 Claims. (Cl. 58—107)

The invention relates to balance wheels for movement regulating arrangements in mechanical time-pieces and similar instruments. Hitherto balance wheels have only been statically adjusted, for which purpose a centre-of-gravity balance was used with two horizontal knife-edges on which the balance is placed with its shaft. By this method only a parallel displacement of the axis of the centre of gravity can be imparted to the axis of rotation of the balance; it is signalized by a force at right-angles to the axis of rotation. For correcting this defect known as "static unbalance." the so-called regulating screws on the balance rim are mostly used, which screws are adjusted according to their specific position relatively to the axis of the centre of gravity and to the axis of rotation of the balance. Finally it is pointed out that, in addition to the regulating screws, so-called balance screws are also provided on the rim of the balance. They do not, however, serve for the purpose of balancing but for changing the moment of inertia of the balance when deviations in movement cannot be corrected to a sufficient extent by shifting the regulator. The balance screws are therefore always arranged in pairs and preferably in double pairs, symmetrically to the axis of rotation of the balance. The changing of the moment of inertia is effected by the number and weight of the balance screws and frequently also by introducing washers.

Up to the present it is not known that it has been endeavoured to adjust the balance wheel also dynamically, that is to eliminate the error which exists when the axis of the centre of gravity is inclined or intersects the axis of the balance which makes itself apparent by the occurrence of a moment of force on the axis of rotation of the balance. The present invention has this object in view and consists in that, in addition to the known adjusting means serving for the parallel shifting of the axis of the centre of gravity into the axis of rotation of the balance, that is for the static balancing of weight, other regulating means are provided on the balance which serve for bringing the axis of the centre of gravity out of the position in which it crosses or intersects the axis of the balance and into coincidence with the axis of rotation of the balance, that is for dynamic equilibration. In a preferred form of construction according to the invention turnable correcting elements are provided symmetrically around the balance rim, the mass distribution of these elements being unsymmetrical to their axis of rotation. These correcting elements are preferably constructed as insert pins. Their shanks extend radially to the axis of the balance and unsymmetry of their mass distribution is attained by cutting away a portion of the pin head parallel to the turning axis of the pin.

Another likewise advantageous form of construction according to the invention is characterized in that regulating screws are arranged symmetrically in relation to the axis of rotation of the balance close to the rim of the balance and which can be screwed in the direction of the axis of the balance. Inwardly extending lugs are provided on the balance rim for the regulating screws, a pair of these flaps being preferably arranged in the cross-piece of the balance.

Experiments have shown that the dynamic equilibration of the wheel balance has a very favorable effect on the performance of the movement.

Figure 2:
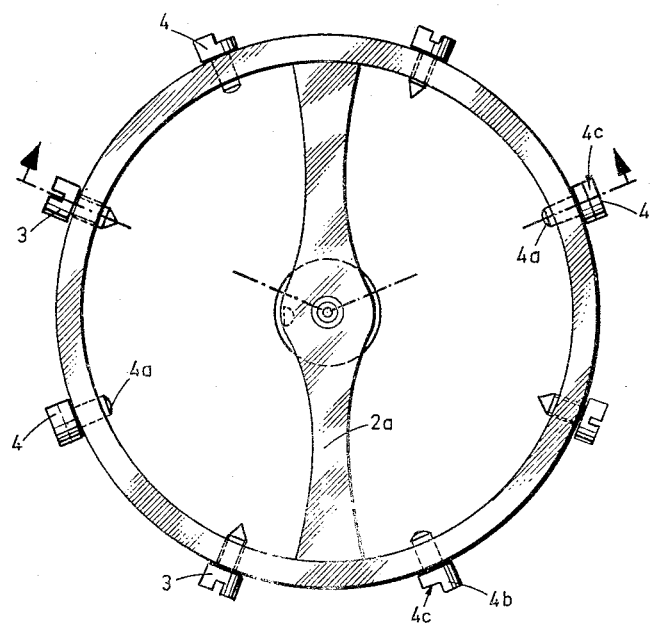

Other features and advantages of the invention will become apparent from the following description of two possible embodiments, from the drawings and from the claims. The drawings are illustrations on an enlarged scale in each case and show Fig. 1 a balance wheel according to the first form of construction viewed from the side and in section on line I—I of Fig. 2;

Fig. 2 a top plan view of Fig. 1;

Fig. 3 a similar view to Fig. 1 showing the second form of construction of the balance wheel according to the invention, being a section on line III—III of Fig. 4, and Fig. 4 a top plan view of Fig. 3.

In the first form of construction (Figs. 1 and 2) the balance shaft is designated by 1, the balance rim by 2 and the cross-piece by 2a. Regulating screws 3 are introduced into the rim and serve for eliminating parallel displacements of the centre-of-gravity axis of the balance, that is for statically equilibrating the balance.

The shanks 4a of pins 4 are inserted into smooth radial bores 2b in the balance rim. The pin shanks 4a and the bores 2b are so dimensioned that a certain degree of binding is obtained, that is the pins hold by friction. The heads of the pins 4 are cut away at 4c.

During the dynamic equilibration one or several of the insert pins 4 are, according to their type and size, turned with the object of bringing the axis of gravity out of an inclined or intersecting position in relation to the axis of rotation of the balance and into a position coinciding therewith.

In the second form of construction (Figs. 3 and 4) 1 designates the axis of the balance and 2 the rim of the balance into which the balance regulating screws 3 are again introduced. In this case screws 21 serve for the dynamic equilibration and are arranged in two pairs mutually displaced through an angle of 90°. The screw-threaded bores 20a for the screws 21 extend parallel to the axis or shaft 1 of the balance and are mounted in widened junction portions 20b of the cross-piece 20c of the balance and in lugs 30d formed on the rim 20 of the balance. The equilibration by means of the screws 21 is effected by screwing one or several of these in the axial direction of the balance. The screws 21 must bind tightly in the threads in order to prevent automatic displacement or loosening after adjustment.

I claim:

1. Compensatable balance wheel with a rim and spaced regulating screws in the rim, comprising adjustable means mounted on the wheel for the parallel displacement of the center of gravity axis to coincide with the axis of the balance thereby constituting static balance of weight, and adjusting means for bringing the axis of the center of gravity from a position inclined to the axis of rotation of the balance to coincide therewith thereby effecting dynamic equilibration of the balance, said means consisting of correcting elements arranged rotatably on the rim of the balance, their mass distribution being unsymmetrical to their axis of rotation located radially to the axis of the balance.

2. Compensatable balance wheel with a rim and spaced regulating screws in the rim, comprising adjustable means mounted on the wheel for the parallel displacement of the center of gravity axis to coincide with the axis of the balance thereby constituting static balance of weight, and adjusting means for bringing the axis of the center of gravity from a position inclined to the axis of rotation of the balance to coincide therewith thereby effecting dynamic equilibration of the balance, said means consisting of pins rotatably held by friction in bores in the balance rim and provided with heads cut away on one side.

References Cited in the file of this patent

UNITED STATES PATENTS

| | | |
|---|---|---|
| 862,465 | Freund | Aug. 6, 1907 |
| 2,385,252 | Bennett | Sept. 18, 1945 |
| 2,492,066 | Schildmeier | Dec. 20, 1949 |

FOREIGN PATENTS

| | | |
|---|---|---|
| 280,067 | Switzerland | Apr. 1, 1952 |